United States Patent
He (10) Patent No.: US 11,871,476 B2
(45) Date of Patent: Jan. 9, 2024

(54) CONFIGURING DISCONTINUOUS RECEPTION FOR DIFFERENT GROUPS OF CELLS

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/061,509

(22) Filed: Oct. 1, 2020

(65) Prior Publication Data
US 2021/0105857 A1    Apr. 8, 2021

Related U.S. Application Data

(60) Provisional application No. 62/909,690, filed on Oct. 2, 2019.

(51) Int. Cl.
*H04W 52/02* (2009.01)
*H04W 76/28* (2018.01)
(Continued)

(52) U.S. Cl.
CPC .......... *H04W 76/28* (2018.02); *H04B 7/0626* (2013.01); *H04W 24/08* (2013.01); *H04W 72/0453* (2013.01); *H04W 80/02* (2013.01)

(58) Field of Classification Search
None
See application file for complete search history.

(56) References Cited

U.S. PATENT DOCUMENTS 10,129,827 B2 * 11/2018 Latheef ................. H04L 1/188
10,212,757 B2 *  2/2019 Wei ....................... H04W 72/23
(Continued)

FOREIGN PATENT DOCUMENTS

EP      3893593 A1 * 10/2021 ............. H04L 5/001
WO   2016046756 A1    3/2016
(Continued)

OTHER PUBLICATIONS

International Search Report and Written Opinion—PCT/US2020/054080—ISA/EPO—dated Dec. 16, 2020.
(Continued)

*Primary Examiner* — Sithu Ko
(74) *Attorney, Agent, or Firm* — Patterson & Sheridan LLP (57) ABSTRACT

Aspects of the present disclosure provide apparatus, methods, processing systems, and computer readable mediums for configuring DRX parameters for groups of serving cells operating in different frequency bands. An example method generally includes receiving first discontinuous reception (DRX) configuration parameters for communications with a first group of cells and second DRX configuration parameters for communications with a second group of cells, wherein the first DRX configuration parameters and the second DRX configuration parameters share common starting time parameters; monitoring for communications by cells operating in first frequency resources based on the first DRX configuration parameters; and monitoring for communications by cells operating in second frequency resources based on the second DRX configuration parameters.

46 Claims, 6 Drawing Sheets

(51) Int. Cl.
*H04W 24/08* (2009.01)
*H04B 7/06* (2006.01)
*H04W 80/02* (2009.01)
*H04W 72/0453* (2023.01)

(56) References Cited

U.S. PATENT DOCUMENTS

| | | | |
|---|---|---|---|
| 10,536,255 B2* | 1/2020 | Miao | H04W 16/24 |
| 10,939,306 B2* | 3/2021 | Müller | H04W 76/28 |
| 2011/0249578 A1* | 10/2011 | Nayeb Nazar | H04L 1/1671 |
| | | | 370/252 |
| 2014/0036742 A1* | 2/2014 | Charbit | H04W 72/1263 |
| | | | 370/280 |
| 2015/0146634 A1* | 5/2015 | Hwang | H04L 1/0073 |
| | | | 370/329 |
| 2015/0208462 A1* | 7/2015 | Lee | H04W 52/0212 |
| | | | 370/311 |
| 2015/0319691 A1* | 11/2015 | Wei | H04W 52/0209 |
| | | | 370/311 |
| 2018/0242283 A1* | 8/2018 | Feng | H04L 5/001 |
| 2020/0120596 A1* | 4/2020 | Yu | H04W 72/04 |
| 2021/0092681 A1* | 3/2021 | Nory | H04W 76/28 |
| 2021/0112536 A1* | 4/2021 | Shah | H04L 5/0048 |
| 2022/0191793 A1* | 6/2022 | Murray | H04W 72/23 |

FOREIGN PATENT DOCUMENTS

| | | |
|---|---|---|
| WO | 12016046756 A1 | 3/2016 |
| WO | 2019033017 A1 | 2/2019 |
| WO | 2020027955 A2 | 2/2020 |

OTHER PUBLICATIONS

Mediatek Inc: "Discussion on Requirements of Inter-Frequency Measurement", 3GPP Draft; R4-1808926, 3GPP TSG-RAN WG4 Meeting #AH1807, 3rd Generation Partnership Project (3GPP), Mobile Competence Centre ; 650, Route Des Lucioles ; F-06921 Sophia-Antipolis Cedex; France, vol. Ran WG4, No. Montreal, Canada; Jul. 2, 2018-Jul. 6, 2018, Jun. 25, 2018 (Jun. 25, 2018), XP051468816, 17 Pages.

Qualcomm Incorporated: "Potential Techniques for UE Power Saving", 3GPP Draft, 3GPP TSG-RAN WG1 #96, R1-1903016 Potential Techniques for UE Power Saving, 3rd Generation Partnership Project (3GPP), Mobile Competence Centre, 650, Route Des Lucioles, F-06921, Sophia-Antipolis Cedex, France, vol. Ran WG1, No. Athens, Greece; Feb. 25, 2019-Mar. 1, 2019, Feb. 16, 2019 (Feb. 16, 2019), XP051600713, 33 pages.

* cited by examiner

CONFIGURING DISCONTINUOUS RECEPTION FOR DIFFERENT GROUPS OF CELLS

CROSS-REFERENCE TO RELATED APPLICATIONS

This application claims benefit to U.S. Provisional Patent Application Ser. No. 62/909,690, entitled "Configuring Discontinuous Reception for Different Groups of Cells," filed Oct. 2, 2019 and assigned to the assignee hereof, the contents of which are hereby incorporated by reference in its entirety.

TECHNICAL FIELD

Aspects of the present disclosure relate to wireless communications, and more particularly, to techniques for configuring discontinuous reception for different groups of cells.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes receiving first discontinuous reception (DRX) configuration parameters for communications with a first group of cells operating in a first frequency band and second DRX configuration parameters for communications with a second group of cells operating in a second frequency band, wherein the first DRX configuration parameters and the second DRX configuration parameters share common starting time parameters, monitoring for communications by the cells operating in the first frequency band based on the first DRX configuration parameters, and monitoring for communications by the cells operating in the second frequency band based on the second DRX configuration parameters.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for signaling and processing dynamic control channel resources.

The following description provides examples of discontinuous reception configuration for different groups of cells, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
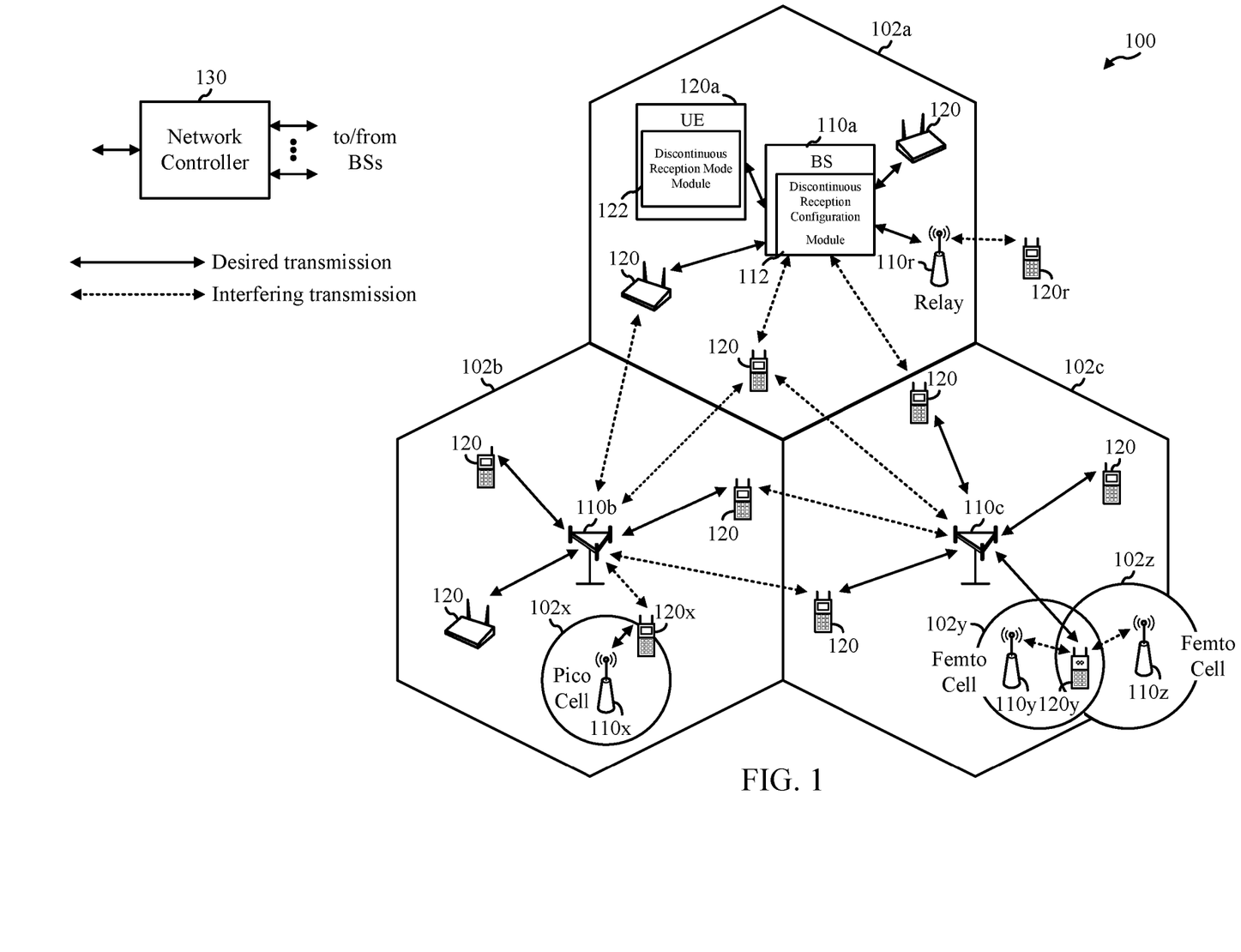
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a Dynamic Control Channel Resource Module 122 that may be configured to perform (or cause UE 120a to perform) operations 500 of FIG. 5. Similarly, base station 110a may include a Dynamic Control Channel Resource Module 112 that may be configured to perform (or cause BS 110a to perform) operations 600 of FIG. 6 (e.g., to signal dynamic control channel resources to a UE performing operations 500).

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
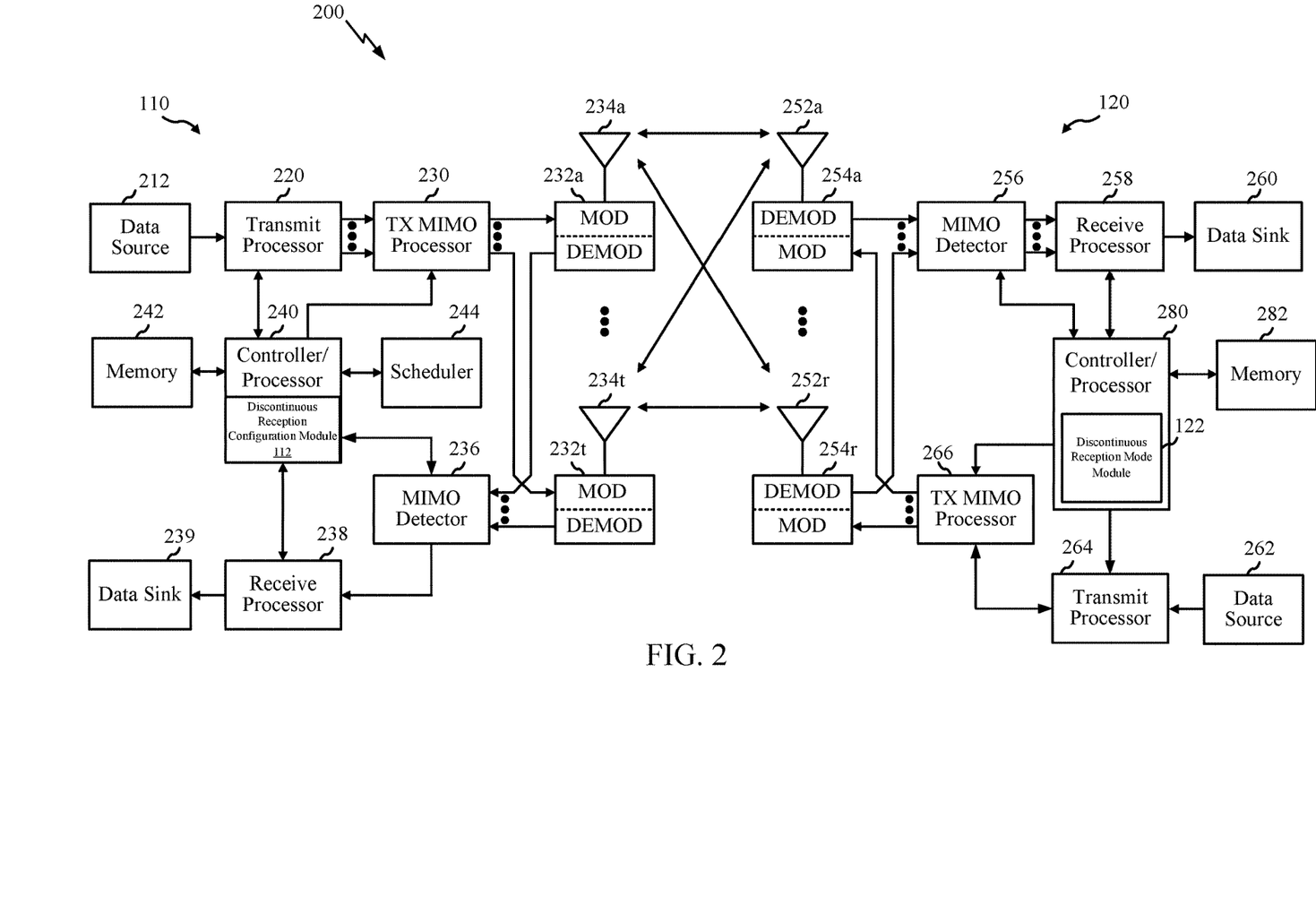
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH)) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a Discontinuous Reception Mode Module 122 that may be configured to perform operations 500 of FIG. 5, while the controller/processor 240 of the BS 110 has a Discontinuous Reception Configuration Module 112 that may configure Discontinuous Reception Mode Module 122 with discontinuous reception configuration information for at least a first and a second group of cells, as discussed in further detail below. Although shown at the Controller/Processor, other components of the UE or BS may be used to perform the operations described herein.

Figure 3:
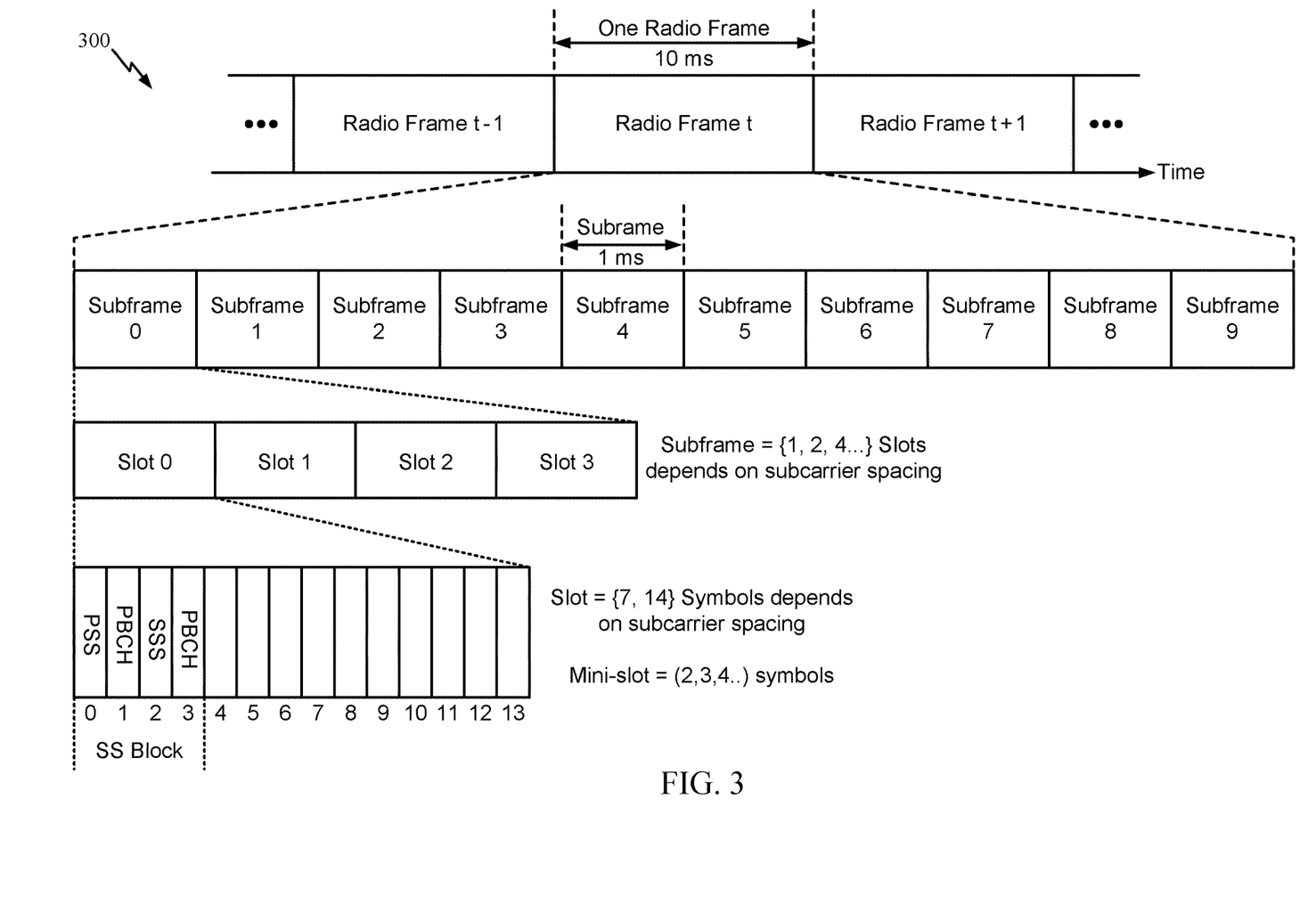
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Discontinuous Reception Procedures for Different Groups of Cells Aspects of the present disclosure provide apparatus, methods, processing systems, and computer readable mediums for configuring discontinuous reception modes at a user equipment for different groups of cells (e.g., in an interband carrier aggregation scenario in which one group of cells serving a user equipment operates in a first set of frequency resources and another group of cells serving the user equipment operates in a second set of frequency resources). As will be described, the techniques presented herein may allow for the use of more sparse "regular" periodic control channel resources, allowing a UE to conserve power by staying in a low power state longer (e.g., unless dynamic control channel resources are indicated in the regular control channel resources).

The techniques presented herein may be applied in various frequency resources, such as frequency bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band, referred to as FR2 (24.25 GHz to 52.6 GHz) with 120 kHz SCS, the slot length is 125 μSec, while in FR4 with 960 kHz, the slot length is 15.6 μSec.

In some discontinuous reception (DRX) procedures where carrier aggregation is configured, the carriers or serving cells may be configured with an identical DRX configuration and follow an identical DRX state machine for transitioning between awake and sleep states. Using an identical DRX configuration for different carriers, however, may be power inefficient. For example, in a scenario in which FR1 and FR2 bands are aggregated to serve a user equipment, FR2 bands may be used for offloading large data bursts, and FR1 bands may otherwise be used for other data transmissions (e.g., data bursts with smaller payloads), as transmissions in the FR2 band may provide higher throughput than transmissions in the FR1 band. However, transmissions in the FR2 band may have higher power consumption than transmissions in the FR1 band. Because of the power requirements for reception of data on higher frequency and higher bandwidth frequency resources (such as FR2 bands), maintaining active operations on the FR2 bands while operating on the FR1 bands may not be power efficient. In another example, traffic can vary within a burst. When traffic load reduces, the network can halt UE monitoring of the physical downlink control channel (PDCCH) on some serving cells to reduce power consumption.

Aspects of the present disclosure provide for configuring UEs for discontinuous reception using a common configuration while allowing for different groups of serving cells to be configured with different DRX inactivity timers and DRX monitoring period timers (e.g., the DRX on duration timer). Generally, the use of a common configuration may entail the use of the same configuration parameters to configure different groups of serving cells, where each of the groups of serving cells are associated with a discrete set of configuration parameters. By configuring DRX using a common configuration (e.g., same configuration parameters) while allowing for the use of different timers for different groups of cells, aspects of the present disclosure may provide for power savings by allowing the UE to enter a sleep state with respect to serving cells operating on higher throughput, higher power consumption bands after traffic slows down on these cells before the UE enters a sleep state with respect to serving cells operating on lower throughput, lower power consumption bands. Further, by configuring UEs with a common configuration (e.g., same configuration parameters), scheduling complexity may be reduced, as UEs may start DRX at the same time.

Figure 4:
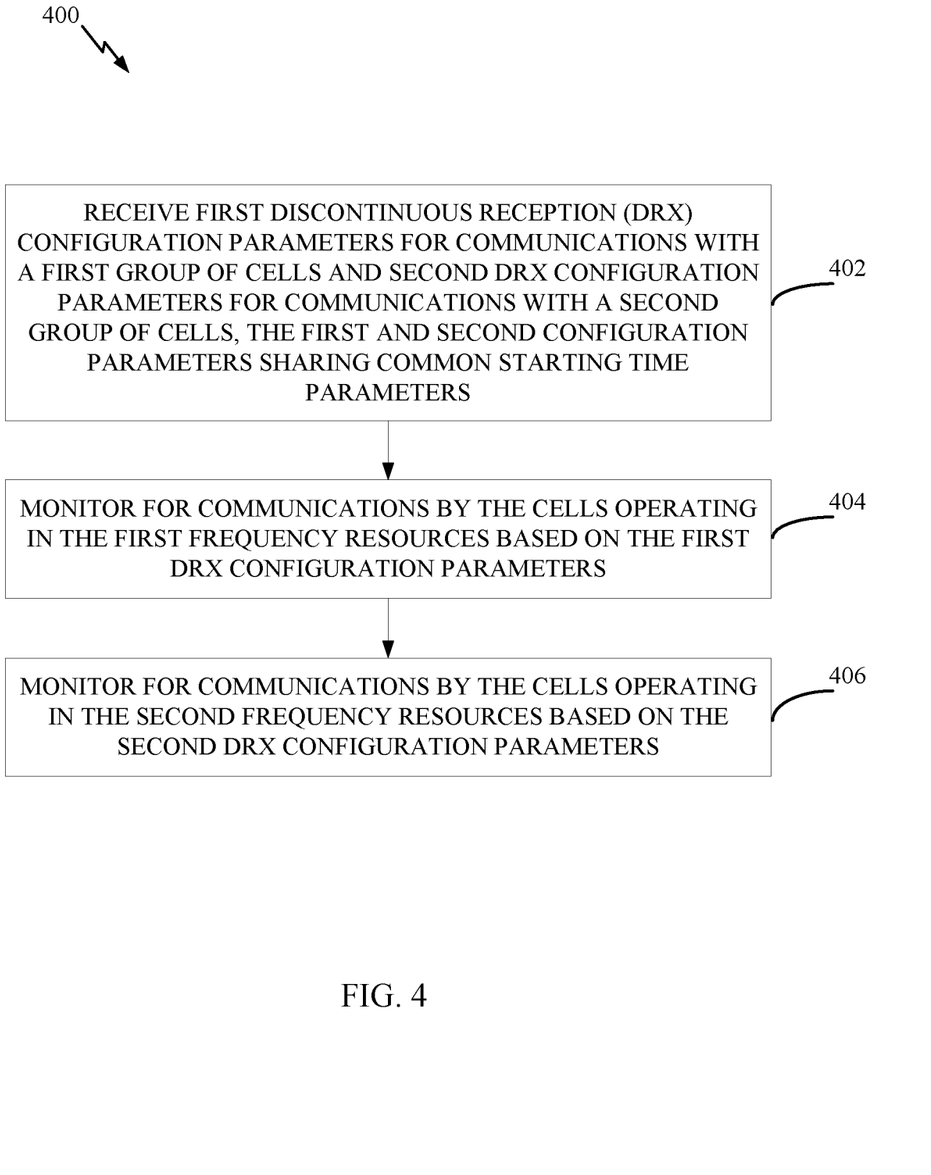
FIG. 4 illustrates example operations for wireless communication by a user equipment (UE), in accordance with some aspects of the present disclosure.

FIG. 4 illustrates example operations 400 for wireless communication by a UE, in accordance with some aspects of the present disclosure. For example, operations 500 may be performed by a UE 120a of FIG. 1 to perform discontinuous reception (DRX) operations with respect to different groups of serving cells, which may operate on different frequency resources. The different frequency resources may include different ranges of frequencies, different pluralities of frequency bands, or other different sets of resources on which the UE may communicate in a wireless communication network.

Operations 400 begin, at block 402, by receiving first discontinuous reception (DRX) configuration parameters for communications with a first group of cells and second DRX configuration parameters for communications with a second group of cells. The first DRX configuration parameters and the second DRX configuration parameters may share common starting time parameters (e.g., specify a same starting time parameter in the first and second DRX configuration parameters), as discussed above, such that DRX cycles start at the same time for the first and the second groups of cells.

At block 404, the UE monitors for communications by the cells operating in a first set of frequency resources based on the first DRX configuration parameters. The first set of frequency resources may include, for example, frequency range including a first set of frequency bands. The first set of frequency resources may be, for example, a frequency band that supports higher throughput using higher frequencies relative to a second set of frequency resources used for communications with the second group of cells.

At block 406, the UE monitors for communications by the cells operating in a second set of frequency resources based on the second DRX configuration parameters. The second set of frequency resources may include, for example, frequency range including a second set of frequency bands. The second set of frequency resources may be, for example, a frequency band that supports lower throughput using lower frequencies relative to the first set of frequency resources used for communications with the first group of cells, as discussed above.

In some embodiments, DRX may be configured such that all serving cells use the same DRX timing parameters. For example, DRX may be configured such that the first set of cells and the second set of cells use a same (or common) short DRX cycle timer duration, a same long DRX cycle timer duration, and/or a same starting offset. That is, each Various techniques may be used to manage the short DRX cycle timer. In some embodiments, a common short DRX cycle timer may be configured for all serving cells, regardless of the frequency band on which the serving cells operate. The short DRX cycle may be started and restarted when a DRX inactivity timer associated with one of the first group of cells or the second group of cells expires and the other inactivity timer is not running. By using a common short DRX cycle timer, a UE may operate with the same type of DRX cycle for all serving cells, regardless of the frequency band on which the serving cells operate. Thus, a UE may be in a short DRX cycle or a long DRX cycle for both the first group of serving cells (which may operate on a lower frequency band, such as FR1) and the second group of serving cells (which may operate on a higher frequency band, such as FR2). Using a common short DRX cycle timer may keep a UE in a short DRX cycle, which may have higher power consumption than a long DRX cycle, for a longer amount of time with respect to serving cells operating on higher bandwidths in scenarios in which there is more traffic on serving cells operating on lower bandwidths. However, where data transmission is more frequently scheduled on serving cells operating on higher frequency bands than on serving cells operating on lower frequency bands, timers for the group of serving cells operating on the lower frequency bands may stop running before timers for the group of serving cells operating on the higher frequency bands.

In another embodiment, each group of serving cells may be associated with its own short DRX cycle timer. The short DRX cycle timer associated with each group of serving cells may be started and restarted by expiry of the inactivity timer associated with that group of serving cells. Configuring a UE with different short DRX cycle timers for different groups of serving cells may provide for increased power savings, as the UE may enter more power efficient states (e.g., a long DRX cycle) with respect to serving cells operating on higher frequency bands prior to entering more power efficient states with respect to serving cells operating on lower frequency bands. However, the DRX cycle start time may diverge over time when a UE is configured with different short DRX cycle timers for different groups of serving cells.

In some embodiments, the DRX active time during which a UE monitors for transmissions on the physical downlink control channel (PDCCH) may be managed on a per-serving cell basis. A serving cell may be in active time when its associated DRX monitoring period timer (e.g., DRX on duration timer) and/or DRX inactivity timer is running. In some embodiments, the monitoring period timer may be, for example, a timer used to specify an amount of time for which a UE monitors for transmissions on a particular channel, such as a timer for monitoring transmissions from a cell on the PDCCH. A UE may enter an active time when a scheduling request has been triggered by the UE and the UE is waiting for an uplink grant from a serving cell. In some embodiments, UE may enter an active time state for serving cells that are configured with the first DRX configuration parameters and not configured with the second DRX configuration parameters (e.g., a secondary DRX monitoring period timer and a secondary DRX inactivity timer) when a scheduling request is triggered. In some embodiments, where serving cells operating on a first frequency band (e.g., FR1) and serving cells operating on a second frequency band (e.g., FR2) belong to different physical uplink control channel (PUCCH) groups, a UE may enter an active state with respect to serving cells in the same PUCCH group as the serving cell to which the UE triggered a scheduling request. A UE may also enter a DRX active time during a random access channel (RACH) procedure in which the UE has transmitted a Radio Resource Control (RRC) Connection Request (i.e., RACH msg3) and is waiting for a response from the serving cell (i.e., RACH msg4).

The short DRX cycle timer may also be managed based on receipt of a DRX media access control (MAC) control element (CE) from one of a plurality of serving cells. In some embodiments, when a DRX MAC CE is received, the UE may halt a DRX monitoring period and inactivity timer, regardless of the cell from which the DRX MAC CE is received, and the UE may restart a DRX short cycle timer. In some embodiments, when the UE receives a DRX MAC CE, the UE may halt the DRX monitoring period and inactivity timer for the group of cells in which the serving cell that the UE received the DRX MAC CE from belongs. For example, if a DRX MAC CE is received from a cell in the second group of cells (e.g., cells operating on the FR2 band), the second set of timers associated with the second group of cells may be halted, and the first set of timers associated with the first group of cells may not be affected. If a single short DRX cycle timer is configured, receipt of a DRX MAC CE from a cell in one of the groups of cells may halt a short DRX cycle timer based on whether an inactivity timer associated with the other group of cells is running. For example, if a DRX MAC CE is received from a cell in the second group of cells, the short DRX cycle timer may be started or restarted if the inactivity timer associated with the first group of cells is not running. In some embodiments, if separate short DRX cycle timers are configured, receipt of a DRX MAC CE may start or restart the short DRX cycle timer for cells in the same group of cells from which the DRX MAC CE was received. In some embodiments, the DRX MAC CE may include an explicit field indicating the group of cells for which the information carried in the DRX MAC CE is applicable.

Persistent or semi-persistent CSI reporting may be configured based on the differing DRX configurations for the first and second groups of serving cells. Typically, a network may configure CSI reporting such that a UE multiplexes CSI reports from different serving cells in the same PUCCH or PUSCH occasions to reduce transmission power; however, because a UE need not report CSI while it is not in an active time state, and because a UE may exit an active time state with respect to the first and second groups of cells at different times, some preconfigured PUCCH resources may not be needed. For example, when a UE enters a sleep state with respect to a second group of cells (e.g., serving cells operating on the FR2 band) and the UE is active with respect to a first group of cells (e.g., serving cells operating on the FR1 band), the UE may report CSI for the first group of cells and may halt CSI reporting for the second group of cells; however, PUCCH resources for the CSI report may be allocated for CSI reports from both the first and second groups of cells. In some embodiments, to manage CSI reporting, CSI from different groups of cells may not be multiplexed in the same PUCCH resource if a UE is configured with first and second DRX configuration parameters. In some embodiments, when a UE enters a sleep state with respect to one group of cells, a CSI report may include padding bits for cells that the UE is not monitoring in the allocated PUCCH resource. In some embodiments, the network may preconfigure a coding rate to use when the UE enters a sleep state with respect to one of the first or second groups of serving cells before entering a sleep state with respect to the other of the first or second groups.

Figure 5:
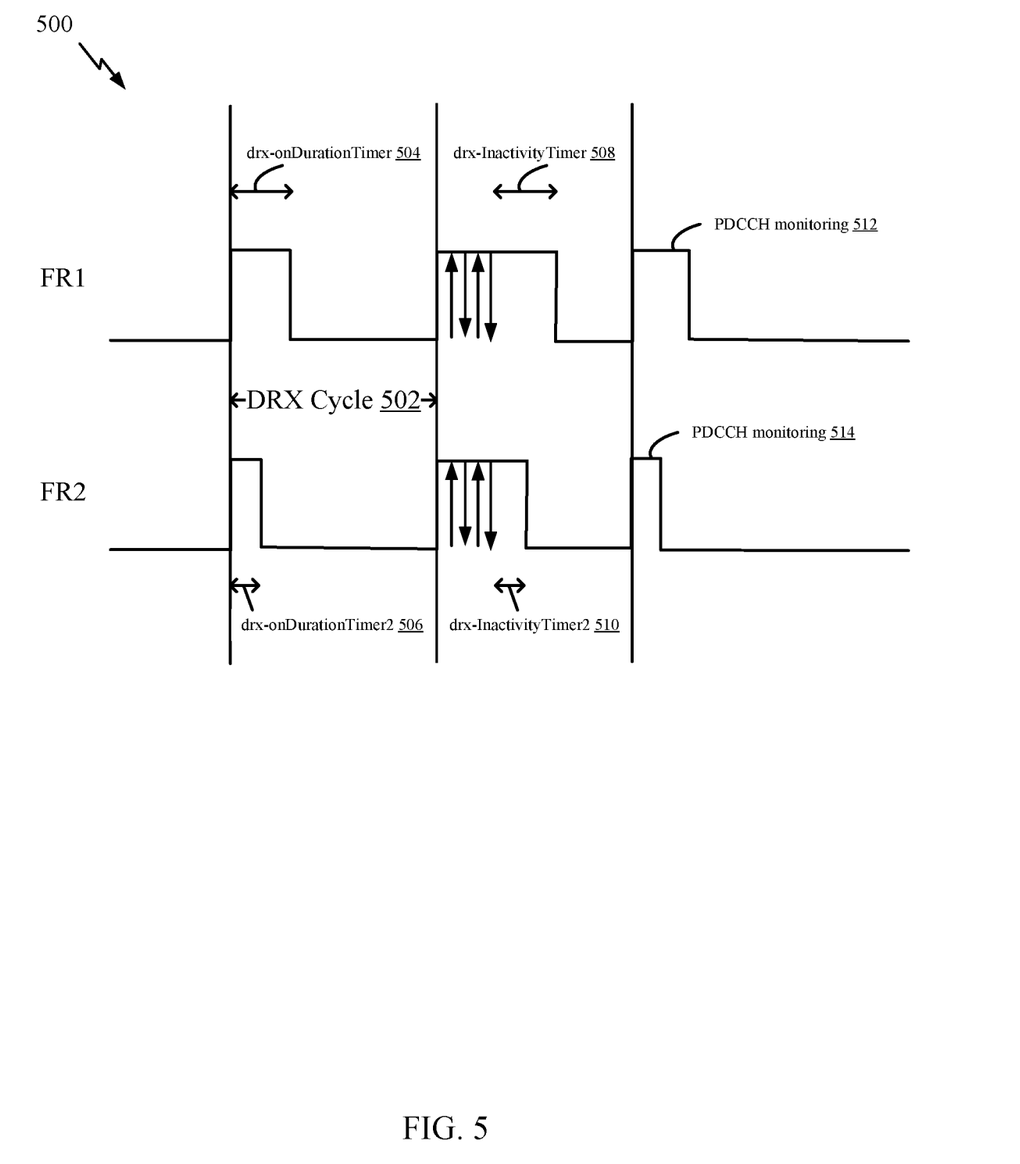
FIG. 5 illustrates an example timeline of discontinuous reception operations for different groups of cells, in accordance with some aspects of the present disclosure.

FIG. 5 illustrates an example timeline 500 of DRX operations for serving cells operating on different bandwidths, according to an aspect of the present disclosure. As illustrated, a UE can use a common DRX cycle timer 502 and starting offset such that the UE begins DRX operations at the same dime. During a DRX cycle, a monitoring period timer (e.g., a DRX on duration timer), a DRX inactivity timer, and a PDCCH monitoring timer may have a longer duration for serving cells operating in lower frequency bands (e.g., the FR1 band) than for serving cells operating in higher frequency bands (e.g., the FR2 band). For example, drx-onDurationTimer 504 for cells operating in the FR1 band may be longer than drx-onDurationTimer2 506 for cells operating in the FR2 band; drx-InactivityTimer 508 for cells operating in the FR1 band may be longer than drx-InactivityTimer2 510 for cells operating in the FR2 band; and the PDCCH monitoring timer 512 for cells operating in the FR1 band may be longer than the PDCCH monitoring timer 514 for cells operating in the FR2 band. As illustrated, the UE may enter a sleep state with respect to serving cells on the higher frequency bands before entering a sleep state with respect to serving cells on the lower frequency bands, which may reduce power consumption at the UE from reducing the amount of time the UE is actively monitoring for data with respect to higher frequency, higher power consumption bands that are used for transmission of large data bursts.

Figure 6:
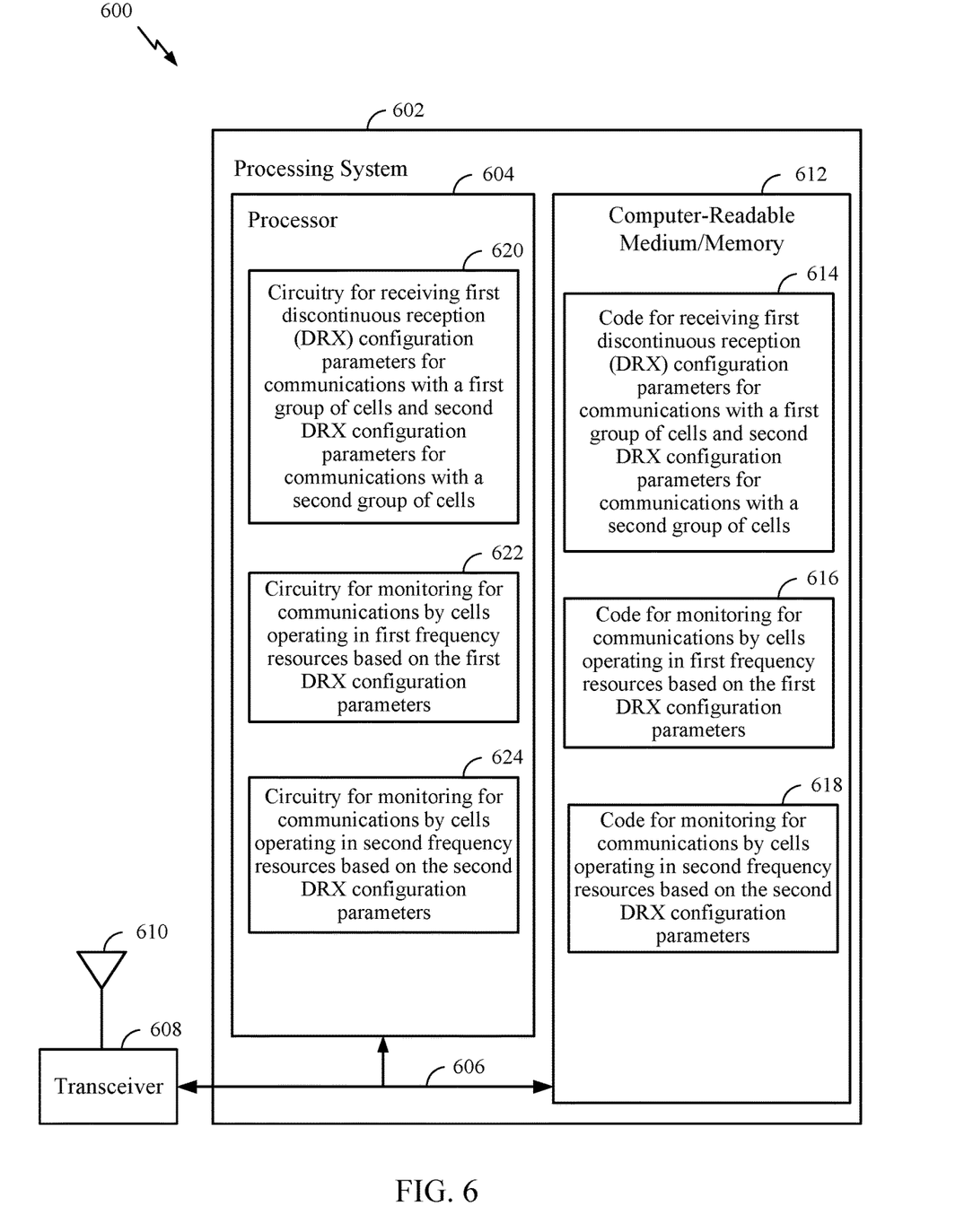
FIG. 6 illustrates a communications device that may include various components configured to perform the operations illustrated in FIG. 4, in accordance with certain aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4, or other operations for configuring discontinuous reception for different groups of cells. In certain aspects, computer-readable medium/memory 612 stores code 614 for receiving first discontinuous reception (DRX) configuration parameters for communications with a first group of cells and second DRX configuration parameters for communications with a second group of cells; code 616 for monitoring for communications by cells operating in first frequency resources based on the first DRX configuration parameters; and code 618 for monitoring for communications by cells operating in second frequency resources based on the second DRX configuration parameters. In certain aspects, the processor 604 has circuitry configured to implement the code stored in the computer-readable medium/memory 612. The processor 604 includes circuitry 620 for receiving first discontinuous reception (DRX) configuration parameters for communications with a first group of cells and second DRX configuration parameters for communications with a second group of cells; circuitry 622 for monitoring for communications by cells operating in first frequency resources based on the first DRX configuration parameters; and circuitry 624 for monitoring for communications by cells operating in second frequency resources based on the second DRX configuration parameters.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   receiving first discontinuous reception (DRX) configuration parameters for communications with a first group of cells and second DRX configuration parameters for communications with a second group of cells, wherein the first DRX configuration parameters and the second DRX configuration parameters share common starting time parameters;
   monitoring for communications by the first group of cells operating in first frequency resources based on the first DRX configuration parameters; and
   monitoring for communications by the second group of cells operating in second frequency resources based on the second DRX configuration parameters,
   wherein the first and second DRX configuration parameters include a common short DRX cycle timer such that the UE operates in a same DRX cycle for the first group of cells operating in the first frequency resources and the second group of cells operating in the second frequency resources, wherein the first group of cells comprises a first group of serving cells, and wherein the second group of cells comprises a second group of serving cells.

2. The method of claim 1, wherein the first frequency resources comprise a first set of frequency bands and the second frequency resources comprise a second set of frequency bands.

3. The method of claim 1, wherein:
   the first and second DRX configuration parameters are set based on the first frequency resources and the second frequency resources such that a monitoring period is shorter for a higher frequency resource than for a lower frequency resource.

4. The method of claim 1, wherein:
   the first and second DRX configuration parameters comprise a same starting offset and a long DRX cycle duration.

5. The method of claim 1, wherein the first DRX configuration parameters include a first short DRX cycle timer and the second DRX configuration parameters include a second short DRX cycle timer, and wherein a length of the first and second short DRX cycle timers is set based on the first frequency resources and the second frequency resources.

6. The method of claim 1, further comprising:
   triggering a scheduling request with respect to a cell; and
   responsive to triggering the scheduling request, activating DRX for serving cells configured with the first DRX configuration parameters but not configured with the second DRX configuration parameters.

7. The method of claim 1, further comprising:
   triggering a scheduling request with respect to a cell; and
   responsive to triggering the scheduling request, activating DRX using the first DRX parameters or the second DRX parameters based on a frequency band in which the cell operates.

8. The method of claim 1, further comprising:
   receiving a DRX media access control (MAC) control element (CE) from one of a plurality of cells;
   responsive to receiving the DRX MAC CE, halting DRX monitoring period and inactivity timers for cells operating on the first and the second frequency resources; and
   restarting a DRX short cycle timer for the cells operating on the first and the second frequency resources.

9. The method of claim 1, further comprising:
   receiving a DRX media access control (MAC) control element (CE) from one of a plurality of cells; and
   halting DRX monitoring period and inactivity timers for cells operating on one of the first or second frequency resources based on a frequency band of the one of the plurality of cells from which the DRX MAC CE was received.

10. The method of claim 1, further comprising:
    receiving a DRX media access control (MAC) control element (CE) from one of a plurality of cells, the DRX MAC CE including an indication of cells for which the DRX MAC CE is applicable; and
    responsive to receiving the DRX MAC CE, halting DRX monitoring period and inactivity timers for the indicated cells.

11. The method of claim 1, further comprising:
    reporting channel state information (CSI) to a plurality of cells, wherein reported CSI for cells operating on the first frequency resources is not multiplexed with reported CSI for cells operating on the second frequency resources.

12. The method of claim 1, further comprising:
    reporting channel state information (CSI) to a plurality of cells, wherein the reported CSI comprises padding bits for cells associated with a frequency band for which the UE is not monitoring based on expiry of a DRX timer.

13. The method of claim 1, further comprising:
    reporting channel state information (CSI) to a plurality of cells based on a network-configured coding rate for reporting CSI for cells operating on frequency bands which the UE is not monitoring based on expiry of a DRX timer.

14. The method of claim 1, further comprising:
    starting a short DRX cycle timer when a DRX inactivity timer associated with the first group of cells expires and a DRX inactivity timer associated with the second group of cells is not running.

15. The method of claim 1, further comprising:
    starting a short DRX cycle timer for the first group of cells based on expiry of a DRX inactivity timer associated with the first group of cells; and
    starting a short DRX cycle timer for the second group of cells based on expiry of a DRX inactivity timer associated with the second group of cells.

16. An apparatus for wireless communications by a user equipment (UE), comprising:
    a memory; and
    one or more processors coupled to the memory and configured to:
       receive first discontinuous reception (DRX) configuration parameters for communications with a first group of cells and second DRX configuration parameters for communications with a second group of cells, wherein the first DRX configuration parameters and the second DRX configuration parameters share common starting time parameters, monitor for communications by the first group of cells operating in first frequency resources based on the first DRX configuration parameters, and monitor for communications by the second group of cells operating in second frequency resources based on the second DRX configuration parameters, wherein the first and second DRX configuration parameters include a common short DRX cycle timer such that the UE operates in a same DRX cycle for the first group of cells operating in the first frequency resources and the second group of cells operating in the second frequency resources, wherein the first group of cells comprises a first group of serving cells, and wherein the second group of cells comprises a second group of serving cells.

17. The apparatus of claim 16, wherein the first frequency resources comprise a first set of frequency bands and the second frequency resources comprise a second set of frequency bands.

18. The apparatus of claim 16, wherein:
the first and second DRX configuration parameters are set based on the first frequency resources and the second frequency resources such that a monitoring period is shorter for a higher frequency resource than for a lower frequency resource.

19. The apparatus of claim 16, wherein:
the first and second DRX configuration parameters comprise a same starting offset and a long DRX cycle duration.

20. The apparatus of claim 16, wherein the first DRX configuration parameters include a first short DRX cycle timer and the second DRX configuration parameters include a second short DRX cycle timer, and wherein a length of the first and second short DRX cycle timers is set based on the first frequency resources and the second frequency resources.

21. The apparatus of claim 16, wherein the one or more processors are further configured to:
trigger a scheduling request with respect to a cell; and
responsive to triggering the scheduling request, activate DRX for serving cells configured with the first DRX configuration parameters but not configured with the second DRX configuration parameters.

22. The apparatus of claim 16, wherein the one or more processors are further configured to:
trigger a scheduling request with respect to a cell; and
responsive to triggering the scheduling request, activate DRX using the first DRX parameters or the second DRX parameters based on a frequency band in which the cell operates.

23. The apparatus of claim 16, wherein the one or more processors are further configured to:
receive a DRX media access control (MAC) control element (CE) from one of a plurality of cells;
responsive to receiving the DRX MAC CE, halt DRX monitoring period and inactivity timers for cells operating on the first and the second frequency resources; and
restart a DRX short cycle timer for the cells operating on the first and the second frequency resources.

24. The apparatus of claim 16, wherein the one or more processors are further configured to:
receive a DRX media access control (MAC) control element (CE) from one of a plurality of cells; and
halt DRX monitoring period and inactivity timers for cells operating on one of the first or second frequency resources based on a frequency band of the one of the plurality of cells from which the DRX MAC CE was received.

25. The apparatus of claim 16, wherein the one or more processors are further configured to:
receive a DRX media access control (MAC) control element (CE) from one of a plurality of cells, the DRX MAC CE including an indication of cells for which the DRX MAC CE is applicable; and
responsive to receiving the DRX MAC CE, halt DRX monitoring period and inactivity timers for the indicated cells.

26. The apparatus of claim 16, wherein the one or more processors are further configured to:
report channel state information (CSI) to a plurality of cells, wherein reported CSI for cells operating on the first frequency resources is not multiplexed with reported CSI for cells operating on the second frequency resources.

27. The apparatus of claim 16, wherein the one or more processors are further configured to:
report channel state information (CSI) to a plurality of cells, wherein the reported CSI comprises padding bits for cells associated with a frequency band for which the UE is not monitoring based on expiry of a DRX timer.

28. The apparatus of claim 16, wherein the one or more processors are further configured to:
report channel state information (CSI) to a plurality of cells based on a network-configured coding rate for reporting CSI for cells operating on frequency bands which the UE is not monitoring based on expiry of a DRX timer.

29. The apparatus of claim 16, wherein the one or more processors are further configured to:
start a short DRX cycle timer when a DRX inactivity timer associated with the first group of cells expires and a DRX inactivity timer associated with the second group of cells is not running.

30. The apparatus of claim 16, wherein the one or more processors are further configured to:
start a short DRX cycle timer for the first group of cells based on expiry of a DRX inactivity timer associated with the first group of cells; and
start a short DRX cycle timer for the second group of cells based on expiry of a DRX inactivity timer associated with the second group of cells.

31. An apparatus for wireless communications by a user equipment (UE), comprising:
means for receiving first discontinuous reception (DRX) configuration parameters for communications with a first group of cells and second DRX configuration parameters for communications with a second group of cells, wherein the first DRX configuration parameters and the second DRX configuration parameters share common starting time parameters;
means for monitoring for communications by the first group of cells operating in first frequency resources based on the first DRX configuration parameters; and
means for monitoring for communications by the second group of cells operating in second frequency resources based on the second DRX configuration parameters,
wherein the first and second DRX configuration parameters include a common short DRX cycle timer such that the UE operates in a same DRX cycle for the first group of cells operating in the first frequency resources and the second group of cells operating in the second frequency resources, wherein the first group of cells comprises a first group of serving cells, and wherein the second group of cells comprises a second group of serving cells.

32. The apparatus of claim 31, wherein the first frequency resources comprise a first set of frequency bands and the second frequency resources comprise a second set of frequency bands.

33. The apparatus of claim 31, wherein:
the first and second DRX configuration parameters are set based on the first frequency resources and the second frequency resources such that a monitoring period is shorter for a higher frequency resource than for a lower frequency resource.

34. The apparatus of claim 31, wherein:
the first and second DRX configuration parameters comprise a same starting offset and a long DRX cycle duration.

35. The apparatus of claim 31, wherein the first DRX configuration parameters include a first short DRX cycle timer and the second DRX configuration parameters include a second short DRX cycle timer, and wherein a length of the first and second short DRX cycle timers is set based on the first frequency resources and the second frequency resources.

36. The apparatus of claim 31, further comprising:
means for triggering a scheduling request with respect to a cell; and
means for activating, responsive to triggering the scheduling request, DRX for serving cells configured with the first DRX configuration parameters but not configured with the second DRX configuration parameters.

37. The apparatus of claim 31, further comprising:
means for triggering a scheduling request with respect to a cell; and
means for activating, responsive to triggering the scheduling request, DRX using the first DRX parameters or the second DRX parameters based on a frequency band in which the cell operates.

38. The apparatus of claim 31, further comprising:
means for receiving a DRX media access control (MAC) control element (CE) from one of a plurality of cells;
means for halting, responsive to receiving the DRX MAC CE, DRX monitoring period and inactivity timers for cells operating on the first and the second frequency resources; and
means for restarting a DRX short cycle timer for the cells operating on the first and the second frequency resources.

39. The apparatus of claim 31, further comprising:
means for receiving a DRX media access control (MAC) control element (CE) from one of a plurality of cells; and
means for halting DRX monitoring period and inactivity timers for cells operating on one of the first or second frequency resources based on a frequency band of the one of the plurality of cells from which the DRX MAC CE was received.

40. The apparatus of claim 31, further comprising:
means for receiving a DRX media access control (MAC) control element (CE) from one of a plurality of cells, the DRX MAC CE including an indication of cells for which the DRX MAC CE is applicable; and
means for halting, responsive to receiving the DRX MAC CE, DRX monitoring period and inactivity timers for the indicated cells.

41. The apparatus of claim 31, further comprising:
means for reporting channel state information (CSI) to a plurality of cells, wherein reported CSI for cells operating on the first frequency resources is not multiplexed with reported CSI for cells operating on the second frequency resources.

42. The apparatus of claim 31, further comprising:
means for reporting channel state information (CSI) to a plurality of cells, wherein the reported CSI comprises padding bits for cells associated with a frequency band for which the UE is not monitoring based on expiry of a DRX timer.

43. The apparatus of claim 31, further comprising:
means for reporting channel state information (CSI) to a plurality of cells based on a network-configured coding rate for reporting CSI for cells operating on frequency bands which the UE is not monitoring based on expiry of a DRX timer.

44. The apparatus of claim 31, further comprising:
means for starting a short DRX cycle timer when a DRX inactivity timer associated with the first group of cells expires and a DRX inactivity timer associated with the second group of cells is not running.

45. The apparatus of claim 31, further comprising:
means for starting a short DRX cycle timer for the first group of cells based on expiry of a DRX inactivity timer associated with the first group of cells; and
means for starting a short DRX cycle timer for the second group of cells based on expiry of a DRX inactivity timer associated with the second group of cells.

46. A non-transitory computer-readable medium having instructions stored thereon which, when executed by a processor, performs an operation for wireless communications by a user equipment (UE), the operation comprising:
receiving first discontinuous reception (DRX) configuration parameters for communications with a first group of cells and second DRX configuration parameters for communications with a second group of cells, wherein the first DRX configuration parameters and the second DRX configuration parameters share common starting time parameters;
monitoring for communications by the first group of cells operating in first frequency resources based on the first DRX configuration parameters; and
monitoring for communications by the second group of cells operating in second frequency resources based on the second DRX configuration parameters,
wherein the first and second DRX configuration parameters include a common short DRX cycle timer such that the UE operates in a same DRX cycle for the first group of cells operating in the first frequency resources and the second group of cells operating in the second frequency resources, wherein the first group of cells comprises a first group of serving cells, and wherein the second group of cells comprises a second group of serving cells.

* * * * *